A. D. ROCHAU.
CAMERA.
APPLICATION FILED JAN. 18, 1915. RENEWED JAN. 10, 1917.

1,228,051.

Patented May 29, 1917.
3 SHEETS—SHEET 1.

Witnesses
C. P. Hardy
J. P. Campbell

Inventor
Albert D. Rochau
By Richard P. Owen.
Attorney

A. D. ROCHAU.
CAMERA.
APPLICATION FILED JAN. 18, 1915. RENEWED JAN. 10, 1917.

1,228,051.

Patented May 29, 1917.
3 SHEETS—SHEET 3.

Witnesses
C. R. Hardy
J. P. Campbell

Inventor
Albert D. Rochau
By Richard B. Owen.
Attorney

UNITED STATES PATENT OFFICE.

ALBERT D. ROCHAU, OF FAIRFAX, OKLAHOMA.

CAMERA.

1,228,051.  Specification of Letters Patent.  Patented May 29, 1917.

Application filed January 18, 1915, Serial No. 2,918. Renewed January 10, 1917. Serial No. 141,695.

*To all whom it may concern:*

Be it known that I, ALBERT D. ROCHAU, a citizen of the United States, residing at Fairfax, in the county of Osage and State of Oklahoma, have invented certain new and useful Improvements in Cameras, of which the following is a specification.

My invention relates to new and useful improvements in a camera and more particularly to an attachment for a camera acting as a signal to prevent danger of more than one picture being taken upon a single film or section of film.

The primary object of the invention is the provision of such an attachment which may be readily attached to any camera of ordinary construction.

A further object of the invention is the provision of means whereby the attachment may be disconnected when the camera is folded or in its inoperative position.

With these and other objects in view the invention consists in the novel details of construction and arrangement of parts which will be more clearly understood from the following description and drawings, in which, Figure 1 is a view in side elevation.

Fig. 7 is a longitudinal vertical section on the line 7—7 of Fig. 3.

Fig. 8 is a fragmental end view of the safety box attachment, parts broken away to show the mechanism in its released position.

Fig. 11 is a detail vertical section through the shutter operating cylinder.

Fig. 12 is a fragmental vertical section on the line 12—12 of Fig. 1, and

Fig. 13 is a fragmental detail of the shaft coupling.

Figure 1:
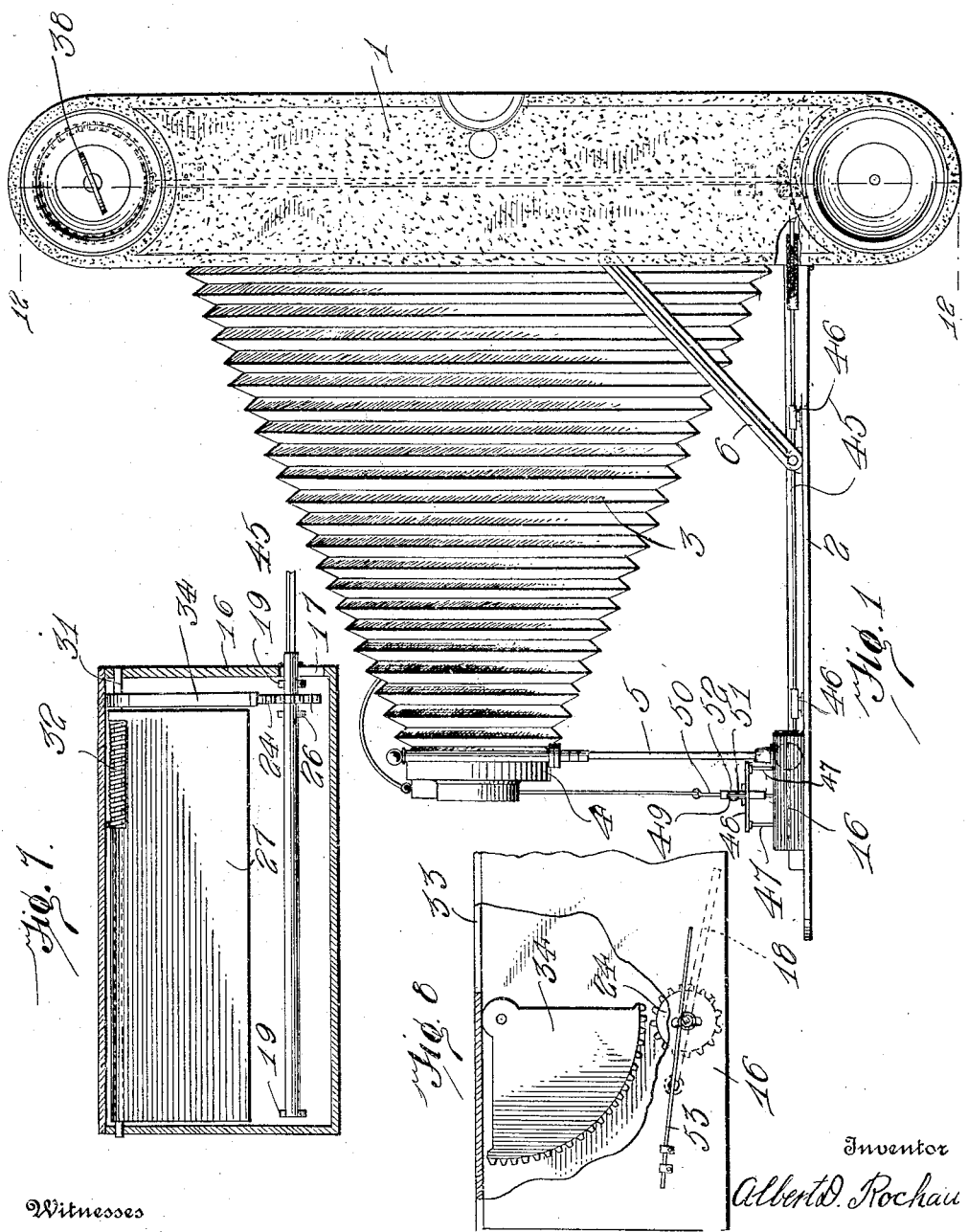

In the past considerable trouble has been experienced in the use of film cameras for the reason that many times more than one exposure would be made upon a single film or section of film. As is well known, the films are sold to the public in the form of rolls and said strip of film is divided into a plurality of sections, each section being of sufficient size for a single exposure or picture. Again very often the operator will forget whether he has turned the film and in this manner take a second picture upon a single section of the film or after the film has already been turned he will turn it again thereby wasting an entire section of film.

It is the object of my invention to overcome these disadvantages and I provide an attachment which may be connected to any film camera so that there will be no danger of more than one picture being taken upon a single section of film. The safety mechanism is adapted to be operated by the film rolling mechanism and is so placed in and upon the camera as to present a neat appearance and to in no way interfere with the operation of the usual parts of the camera.

In the drawings, I have illustrated my safety attachment as being applied to a film camera of the folding type. The camera comprises a box 1 having one face open and adapted to be closed by means of the hinged cover or lid 2. The ordinary extensible or collapsible focusing hood is indicated at 3 and connected to the box 1 in the ordinary manner. The focusing hood 3 is connected at the front end to the shutter casing 4 and said shutter casing is supported by suitable rods 5 which are slidable upon the ordinary track carried by the cover or lid 2, whereby the extensible focusing hood may be collapsed within the box 1 and the cover or lid closed. Pivotally connected to the box 1 and to the cover or lid 2 are the slotted brace bars 6 of ordinary construction.

Figure 2:
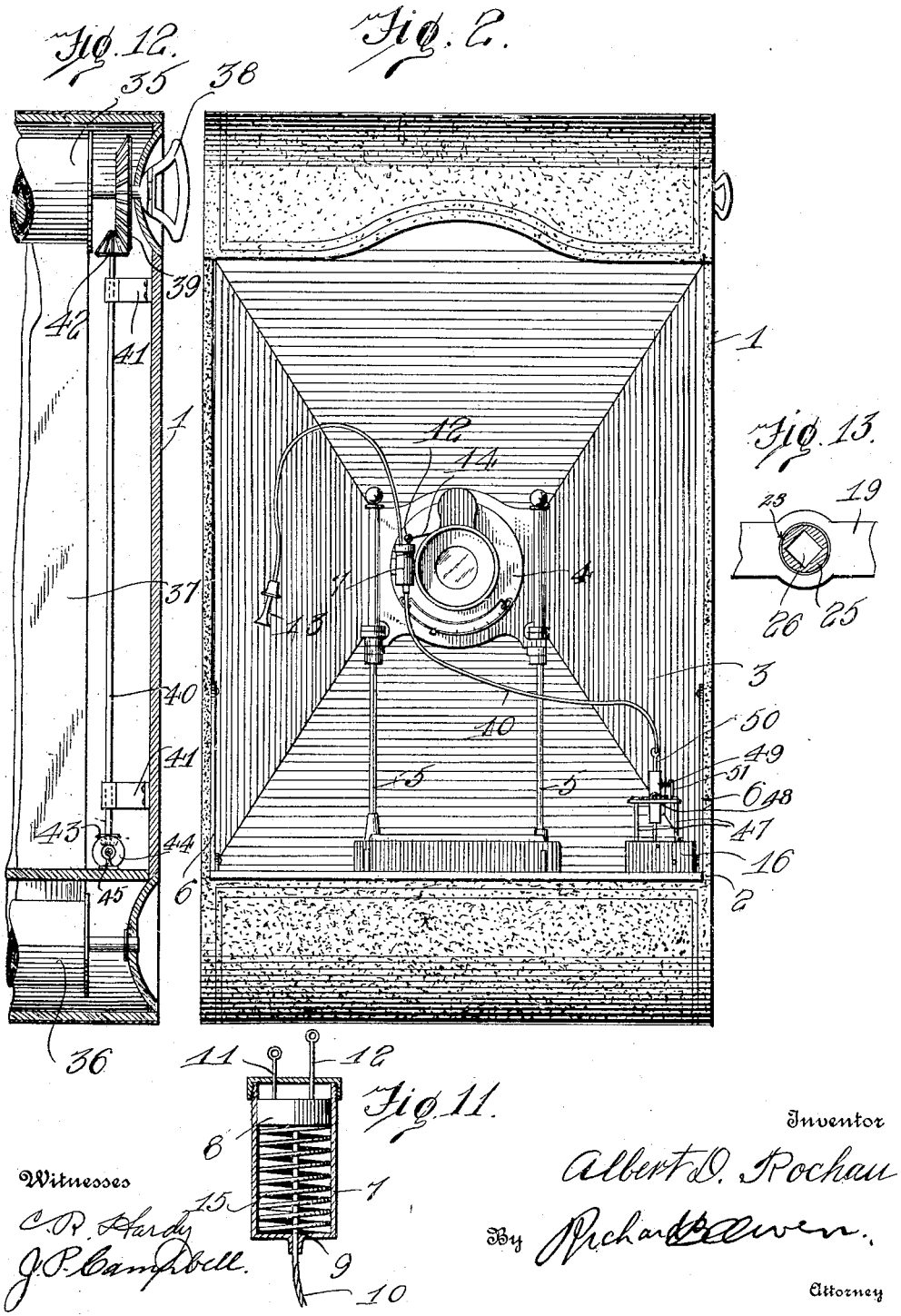
Fig. 2 is a front elevation.
Figure 3:
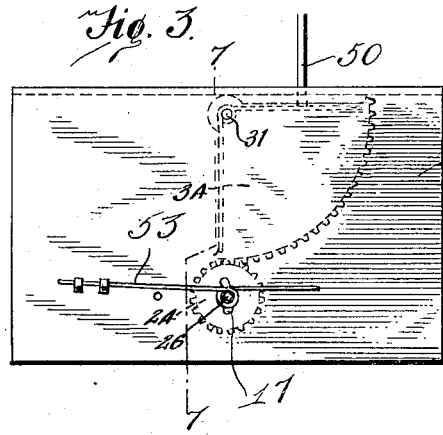
Fig. 3 is an end view of the safety box attachment.
Figure 10:
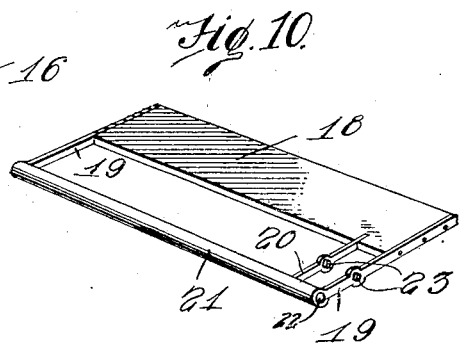
Fig. 10 is a detail of the releasing treadle.

Connected to one side of the shutter casing 4 is a cylinder 7 in which operates a piston 8 having a piston rod 9 extending through the lower end of the cylinder 7 and connected to the flexible rod 10 which operates my safety attachment. Connected to the piston 8 are the rods 11 and 12, each of which is provided at the top with an eye and the rod 11 is connected to the shutter releasing plunger 13 of ordinary construction and the rod 12 is connected to the shutter by means of the rod 14, as indicated in Fig. 2 of the drawings. A coil spring 15 surrounds the piston rod 9 within the cylinder and between the lower end of the cylinder and the piston 8.

Figure 4:
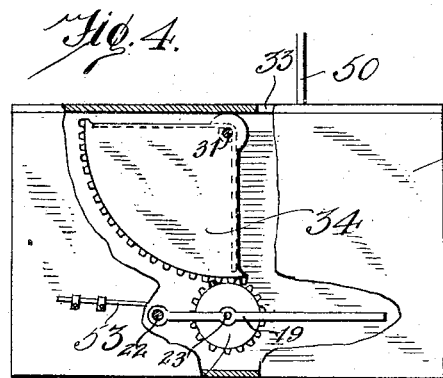
Fig. 4 is an end view, parts broken of the safety box attachment.
Figure 5:
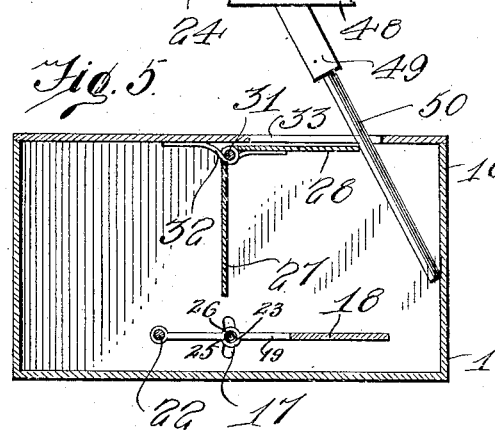
Fig. 5 is a transverse vertical section through the safety box attachment.
Figure 6:
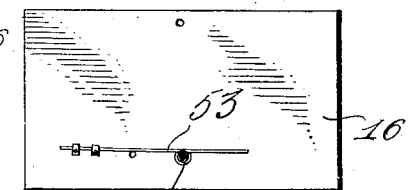
Fig. 6 is an end detail view of the safety box attachment.

Connected to the cover or lid 2 near the forward end thereof is a box or casing 16 in which is housed a number of parts of the safety attachment. In the ends of the box or casing 16 are provided the elongated openings 17, the purpose of which will be presently described. A treadle or platform 18 is pivotally connected within the box 16 and said treadle or platform is provided with the arms or extensions 19 on the ends thereof and a rod or extension 20 intermediate the arms or extensions 19. A tube 21 is connected to the arms or extensions 19 and 20 and a rod 22 is adapted to extend through said tube and through the sides of the casing 16 for pivotally connecting the platform or treadle 18 thereto and as more clearly shown in Figs. 4 and 5 of the drawings. Openings 23 are provided in one of the end arms or extensions 19 and the extension 20 and form a bearing for a pinion 24, more clearly shown in Figs. 4 and 6 of the drawings. The pinion 24 is provided on each side with an extension 25 which passes through the opening 23 and said extensions 25 are provided with the squared opening 26, as more clearly shown in Fig. 13 of the drawings and the purpose of which will be presently described.

Figure 9:
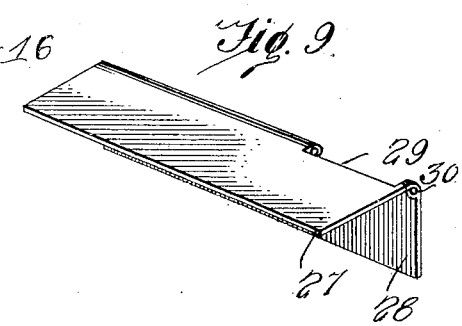
Fig. 9 is a detail of the safety gate.

Pivotally connected in the upper end of the box 16 is a gate having the wings 27 and 28 and the cutout portion 29, as more clearly shown in Fig. 9 of the drawings. This gate is provided with an elongated eye, as indicated at 30, and a rod 31 passes through said eye for pivotally connecting the gate to the box 16. A spring 32 surrounds the rod 31 within the cutout portion 29 and one end of the spring engages the underside of the top of the box 16 and the opposite end of the spring engages the underside of the wing 28. An opening 33 is provided in the top of the box 16 and the wing 28 of the gate is adapted to extend beneath said opening, as clearly shown in Fig. 5 of the drawings, and the wing 27 extends in a vertical position, as shown. Connected to the rod 31 is a segment 34 having teeth which are adapted to mesh with the pinion 24.

The numerals 35 and 36 represent the upper and lower rolls, respectively, for the film and 37 indicates the film. These features are more clearly shown in Fig. 12 of the drawings. A key 38 is connected to the upper roll for operating the same and connected to the key rod is a bevel gear 39. A vertical rod 40 is connected within the box 1 by means of the brackets 41 and on the upper end of this rod 40 is a bevel gear 42 which is adapted to mesh with the bevel gear 39. A bevel gear 43 is secured to the lower end of the rod 40 and meshes with a bevel gear 44 which is connected to the end of a rod 45 which is connected to the cover or lid 2 by means of the brackets 46. The forward end of the rod is made square and is adapted to be received within the square opening 26 in the extension 25 of the pinion 24.

Secured to the top of the box 16 are the vertical rods 47 to the top of which are connected the horizontal rods 48. Pivotally connected to the rods 48 is a vertical tube or cylinder 49 in which slides a rod 50 having an eye formed on the upper end to which is connected the flexible rod 10. A rod 51 is secured upon one of the bars 48 and a coil spring 52 is connected to said rod and cylinder 49. Secured to the side of the box 16 is a spring 53 which engages the underside of the extension 25 of the pinion 24 and normally holds the platform or treadle 18 in raised position.

It is thought that the operation and advantages will be clearly understood. The wing 28 of the gate normally extends beneath the opening 33 in the top of the box 16. When the roll of films is inserted in the camera it is turned by means of the key 38 so as to assume a position ready for the first exposure. The rod 50 will rest upon the top of the wing 28 and as the film is turned the rod 45 will also be turned through means of the rod 40 and bevel gears 42, 43 and 44 and thereby turn the pinion 24 which meshes with the segment 34 and will operate the same so as to swing in such a position that the wing 28 will be in a vertical position and the wing 27 assumes a horizontal position under the top of the box. When an exposure is to be made the plunger 13 is operated thereby lowering the piston 8 which operates the shutter and at the same time forces the flexible rod 10 down which in turn forces the rod 50 down into the box 16 and upon the platform or treadle 18. The platform or treadle is thereby lowered removing the pinion 24 from engaging with the teeth upon the segment 34 and the coil spring 32 swings the segment and gate into their first positions and wing 28 extending beneath the opening 33. By having the tube 49 pivotally connected, as described, the rod 50 can swing into the position shown in Fig. 5 of the drawings and can be gradually raised or removed from the box as the piston 8 in the cylinder 7 is raised by means of the spring 15. By referring to Fig. 5 of the drawings it will be seen that the wing 28 is of such a length as to allow a space between the end of the wing and end of the opening. When the rod 50 is raised from the treadle or platform 18 the spring 53 will force the pinion 24 back into engagement with the segment 34. The wing 28 will remain across the opening 33 until the film is turned in position for the next exposure and when the wing 28 is across the opening the rod 50 cannot be lowered nor the shutter operated. When the camera is to be closed or folded the rod 50 can be removed from the tube 49 and the flexible focusing hood folded back into the box 1.

Having fully described the invention what I claim as new and desire to secure by Letters Patent is:—

1. A camera comprising a casing, film rolls mounted in said casing, a film exposing shutter, a box secured to the casing, a gate pivotally connected within the box, a plunger connected to the shutter and engaging the gate, and means connected to the film for operating the gate.

2. A camera comprising a casing, film rolls mounted in the casing, a film exposing shutter, a box secured to the casing, a gate pivotally connected within the box, a plunger pivotally connected to the shutter and adapted to engage the gate, and means for simultaneously operating the shutter and plunger.

3. A camera comprising a casing, a cover pivotally connected to the casing, film rolls mounted within said casing, a film exposing shutter, a box carried by the cover, a gate pivotally connected to the box, a plunger connected to the shutter and adapted to engage the gate, means connected to the film for operating the gate, and means for simultaneously operating the shutter and plunger.

4. A camera comprising a casing, a cover hinged to said casing, film rolls mounted in said casing, a film exposing shutter, a box secured to the cover, a gate pivotally mounted within the box, a plunger connected to the shutter and adapted to engage the gate, a rod rotatably secured to the cover and connected to the gate, and means connected to the films for rotating the rod.

5. A camera comprising a casing, a cover hinged to said casing, film rolls mounted in said casing, a film exposing shutter, a box secured to the cover, a gate pivotally connected within the box, a plunger connected to the shutter and adapted to engage the gate, a rotatable rod mounted in the casing and connected to one of the rolls, a rotatable rod secured to the cover and connected to the rod within the casing, and means connecting said rod on the cover with the gate in the box.

6. A camera comprising a casing, film rolls mounted in said casing, a film exposing shutter, a cover hinged to the casing, a box secured to the cover, a gate pivotally secured within the box, means connected to the film for operating the gate, and means within the box for releasing the gate.

7. A camera comprising a casing, a cover hinged to the casing, film rolls mounted within the casing, a film exposing shutter, a box having an opening in the top thereof secured to the cover, a gate pivotally connected to the box and adapted to close the opening, a plunger connected to the shutter and adapted to rest upon the gate, means connected to the film for operating the gate, and means for simultaneously operating the shutter and plunger.

8. A camera comprising a casing, a cover hinged to the casing, film rolls mounted in the casing, a film exposing shutter, a box having an opening in the top thereof secured to the cover, a gate pivotally mounted within the box and adapted to close the opening, a plunger connected to the shutter and adapted to rest upon the gate, means connected to the films for operating the gate, means for simultaneously operating the plunger and shutter, and means for releasing the gate.

9. A camera comprising a casing, a cover hinged to the casing, film rolls mounted in the casing, a film exposing shutter, a box having an opening in the top secured to the cover, a gate pivotally mounted within the box and adapted to close the opening, a toothed segment secured to the gate, a platform pivotally mounted within the box, a gear carried by said platform and adapted to engage the toothed segment, means connecting the film and gear for operating the gate, and means for releasing the gear from the segment.

10. A camera comprising a casing, a cover hinged to the casing, film rolls mounted in said casing, a film exposing shutter, a box having an opening in the top thereof secured to the cover, a gate pivotally mounted within the casing and adapted to cover the opening, a plunger connected to the shutter and adapted to engage the gate, a toothed segment secured to the gate, a platform pivotally mounted within the box, a gear connected to said platform and adapted to mesh with the toothed segment, and means connected to the film for operating the gear.

11. A camera comprising a casing, a cover hinged to the casing, film rolls mounted within the casing, a film exposing shutter, a box having an opening in the top secured to the cover, a gate pivotally mounted within the box and adapted to close the opening, a plunger pivotally connected to the box and adapted to engage the gate, means connecting the shutter and plunger, and means connected to the films for operating the gate.

12. A camera comprising a casing, a cover hinged to the casing, film rolls mounted in said casing, a film exposing shutter, a box having an opening in the top secured to the cover, a gate pivotally mounted within the box and adapted to close the opening, a plunger pivotally connected to the box and adapted to engage the gate, means connecting the shutter and plunger, a toothed segment secured to the gate, a platform pivotally mounted within the box, a gear secured to said platform and adapted to mesh with the toothed segment, and means connecting one of the film rolls and platform gear for operating the gate.

13. A camera comprising a casing, a cover hinged to the casing, film rolls mounted within said casing, a film exposing shutter, a box having an opening in the top secured to the cover, a spring controlled gate pivotally mounted within the box, a plunger pivotally connected to the box and adapted to engage the gate, means connecting the shutter and plunger, means for simultaneously operating the shutter and plunger, and means connected to one of the film rolls for operating the gate.

14. A camera comprising a casing, a cover hinged to the casing, film rolls mounted within the casing, a film exposing shutter, a box having an opening in the top secured to the cover, a spring controlled gate pivotally mounted within the box and adapted to close the opening, a plunger pivotally connected to the box and adapted to engage the gate, means connecting the plunger and shutter, a toothed segment secured to the gate, a platform pivotally mounted within the box, a gear secured to the platform and adapted to mesh with the toothed segment, a spring for normally holding the platform in raised position, and means connected to one of the film rolls and gear for operating the gate.

15. A camera comprising a casing, a cover hinged to the casing, film rolls mounted within the casing, a film exposing shutter, a box having an opening in the top secured to the cover and provided in one end with an elongated vertical opening, a gate pivotally mounted within the box and adapted to cover the opening, a toothed segment secured to the gate, a platform pivotally mounted within the box, a gear carried by said platform and adapted to mesh with the toothed segment, an extension formed on the gear and extending through the elongated vertical opening of the box, a spring adapted to engage said extension, and means connected to one of the film rolls and gear for operating the gate.

16. A camera comprising a casing, a cover hinged to the casing, film rolls mounted within the casing, a film exposing shutter, a box having an opening in the top secured to the cover, a gate pivotally mounted within the box and adapted to cover the opening, a tube pivotally connected to the box, a plunger operating through said tube and adapted to engage the gate, means connecting the shutter and plunger, a toothed segment connected to the gate, a platform pivotally mounted within the box, a gear carried by said platform and adapted to mesh with the toothed segment, and means connected to one of the film rolls and gear for operating the gate.

17. A camera comprising a casing, a cover hinged to the casing, film rolls mounted in the casing, a film exposing shutter, a box having an opening in the top secured to the cover, a gate pivotally mounted within the casing and adapted to cover the opening, a spring controlled tube pivotally connected to the box, a plunger operating through said tube and adapted to engage the gate, means connecting the shutter and plunger, and means connected to one of the film rolls for operating the gate.

18. A camera comprising a casing, a cover hinged to the casing, film rolls mounted in said casing, a film exposing shutter, a box having an opening in the top thereof secured to the cover, a gate pivotally connected within the box and adapted to cover the opening, a plunger connected to the box and adapted to engage the gate, means for operating the gate, a cylinder, a piston operating in said cylinder, means connecting the piston and plunger, means connecting the piston and shutter, and means for operating the piston.

In testimony whereof I affix my signature in presence of two witnesses.

ALBERT D. ROCHAU.

Witnesses:
  G. W. DILLON,
  C. S. HUFFAKER.

Copies of this patent may be obtained for five cents each, by addressing the "Commissioner of Patents, Washington, D. C."